May 14, 1929.  G. BOGGIO  1,713,368
PLASTER CAST CUTTING MACHINE
Filed Sept. 9, 1926.  2 Sheets-Sheet 1
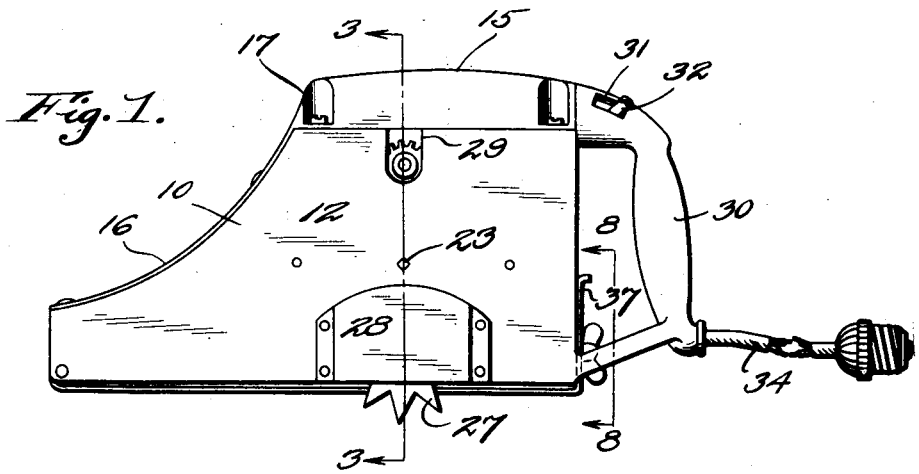
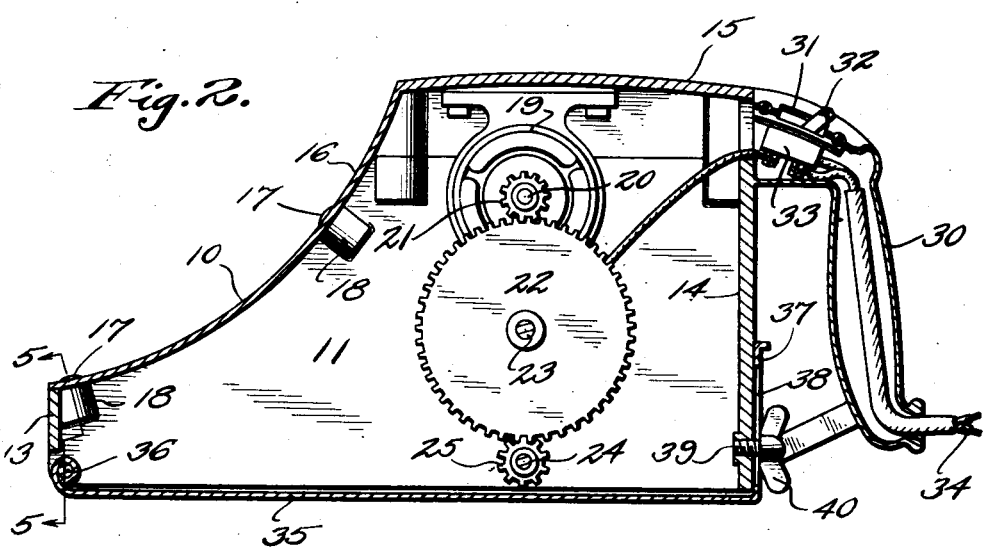
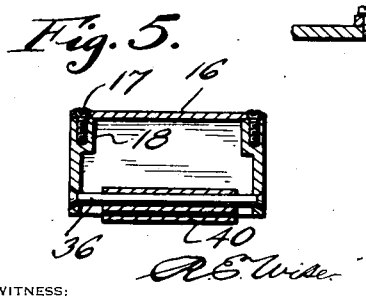
Giusto Boggio
INVENTOR
BY Victor J. Evans
ATTORNEY May 14, 1929.  G. BOGGIO  1,713,368
PLASTER CAST CUTTING MACHINE
Filed Sept. 9, 1926  2 Sheets-Sheet 2
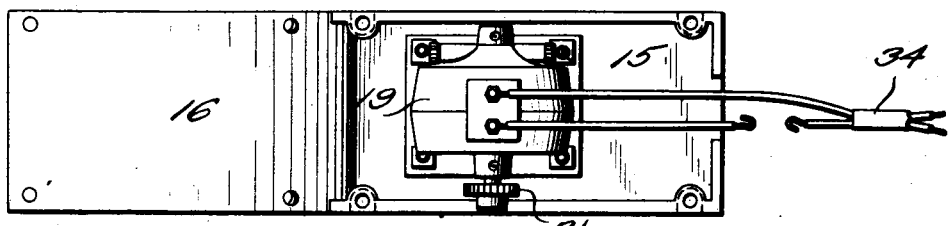
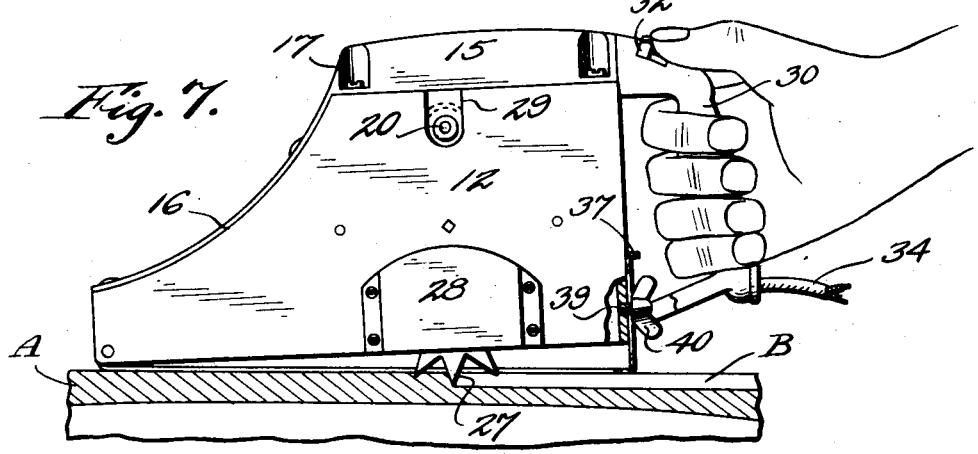
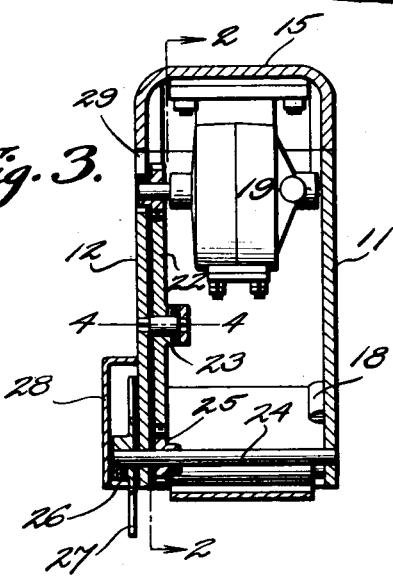
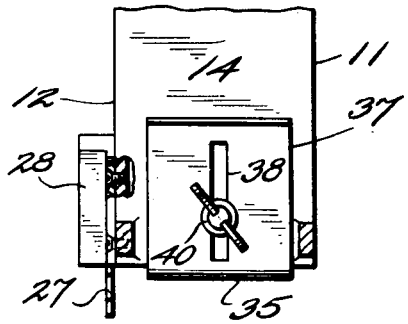
Giusto Boggio
INVENTOR
BY Victor J. Evans
ATTORNEY
WITNESS:

Patented May 14, 1929.

1,713,368

UNITED STATES PATENT OFFICE.

GIUSTO BOGGIO, OF ROYALTON, ILLINOIS.

PLASTER-CAST-CUTTING MACHINE.

Application filed September 9, 1926. Serial No. 134,537.

This invention relates to surgical implements, particularly to saws or cutters, and has for its object the provision of a novel device by means of which plaster casts about broken limbs or other parts of the body may be quickly and easily cut to facilitate or effect removal thereof, the device being intended principally for use by surgeons, physicians, hospital attendants and others having occasion to employ it.

An important object is the provision of a device of this character which is electric motor operated and which will operate with considerable power and efficiency for carrying out the purpose for which it is intended.

Another object is the provision of a device of this character provided with means for easily regulating the depth of the cut made by the rotary saw.

Another object is to provide a device of this character in which the cover section carrying the motor is removable from the main or body portion of the device so as to facilitate access to the motor for the purpose of oiling or making any repairs which may be necessary.

An additional object is the provision of a device of this character which will be comparatively simple and inexpensive in manufacture, easy to use, efficient and convenient in action, durable in service, and a general improvement in the art.

With the above and other objects and advantages in view, the invention consists in the details of construction, the combination and arrangement of parts to be hereinafter more fully described and claimed, and illustrated in the accompanying drawings, in which:—

Figure 1 is a side elevation of the device.

Figure 2 is a vertical longitudinal sectional view, taken on the line 2—2 of Figure 3.

Figure 3 is a cross sectional view taken on the line 3—3 of Figure 1.

Figure 4 is a detail section taken on the line 4—4 of Figure 3.

Figure 5 is a detail section taken on the line 5—5 of Figure 2.

Figure 6 is a bottom plan view of the cover removed from the main or body portion of the device.

Figure 7 is a side elevation of the device, with a part broken away and in section, and showing the action of the adjusting means, and Figure 8 is a fragmentary view taken on the line 8—8 of Figure 1.

Referring more particularly to the drawings, I have shown the device as comprising a casing designated as a whole by the numeral 10, this casing being of any desired size and shape as well as material and finish. In the present instance the casing is shown as including side portions 11 and 12 and forward and rear end portions 13 and 14 respectively. The top of the casing is open and normally closed by a casing section 15 which is formed with or secured to a top member 16, the members 15 and 16 together constituting a closure for the entire top of the casing. Any suitable means may be provided for holding the section 15 in place though in the present instance I have represented the securing means as comprising suitable screws 17 passing through the removable section and threaded into suitable bosses 18 within the casing 10.

Suitably secured to the underside of the section or top member 15 is an electric motor 19 of suitable power having its shaft 20 carrying a spur gear 21 adapted to mesh with a large spur gear 22 journaled on a stub shaft 23 carried by the side wall 12 of the casing. Journaled transversely through the lower portion of the casing is a shaft 24 on which is mounted a pinion 25 meshing with the spur gear 22 and on which is also mounted and held, as by a set screw 26, a circular saw 27 which is located within the confines of a housing 28 secured upon the side wall 12, this housing acting as a protective shield for the saw during the rotation thereof.

In order that the top section 15 may be detached from the main casing 10, carrying with it the motor 19, the upper edge of the wall 12 is shown as provided with a notch or opening 29 which accommodates the hub of the spur gear 21.

Suitably secured to the rear end wall 14 of the casing is a hollow handle structure 30 which is slotted at its upper portion, as shown at 31 to provide or permit access to a handle 32 of a switch 33 mounted within the handle and connected with the current carrying wires 34 which lead from any suitable source of current to the motor 19. By operating the switch handle 32, it is quite clear that the motor may be energized or deenergized at will. The exact details of construction of the switch are not given inasmuch as it may be any one of a number of different types, any of which would be satisfactory.

In order that the depth of cut made by the saw 27 may be regulated, I provide a bottom member 35 for the casing 10, this bottom member being suitably hinged at 36 at the forward end of the casing and having its rear end formed with an upward extension 37 slotted at 38 for the accommodation of a clamping screw 39 which projects from the rear wall 14 and which carries a screw 40.

In the operation of the device, it will be apparent that by loosening the nut 40 the bottom member 35 may be adjusted either upwardly or downwardly, as the case may be, so as to vary the degree of projection of the saw beyond it so that the cut or depth of cut made by the saw may be easily regulated. Of course, after the proper adjustment is found, the nut 40 should be tightened to maintain the parts in this position. Whenever it is desired to cut a plaster cast or the like indicated at A, the operator takes the device by the handle 13 and places it in position upon the plaster cast and operates the switch to energize the motor. When the motor is in action it is of course apparent that the gearing interposed between its shaft and the shaft 24 will operate to rotate the saw 27 at high speed, this saw acting to cut away the plaster cast as indicated at B.

After the cast has been cut nearly through, it is a simple matter to break it along the line of sawing or cut it by some other manner so that it may be quickly and easily removed and without danger of injury to the patient.

If for any reason it is necessary to repair or oil the motor, the screws 17 may be removed and the section 15 carrying the plate member 16 removed, the motor coming along with it. This inside view of the top member is disclosed in Figure 6. When this has been done it is of course apparent that access is readily had to the motor for the purpose of making any repairs or adjustment thereto. It is really believed that the construction, operation and advantages will be readily apparent to one skilled in the art without further explanation.

While I have shown and described the preferred embodiment of the invention, it should be understood that I reserve the right to make such changes in the form, construction, and arrangement of parts as will not depart from the spirit of the invention or the scope of the subjoined claims.

What I claim is:

1. A plaster cast cutting machine comprising a casing provided with a handle, a removable top section for the casing, an electric motor secured to and depending from the top section, the bottom section having one side wall provided with a notch for the accommodation of the motor shaft, a drive pinion on the motor shaft located within the casing, a circular saw journally supported by the casing, and a train of gears permanently located within the casing and connecting the saw with said drive pinion.

2. A plaster cast cutting machine comprising a casing provided with an operating handle, a power mechanism located within the casing, a rotary saw journally supported by the casing at one side thereof and projecting beyond the bottom edge, transmission mechanism between said power mechanism and the saw for effecting rotation of the latter, and an adjustably mounted bottom member for the casing acting as a guide or stop to adjust the depth of cut made by the saw, said member being pivoted at its forward end to the casing and having its rear end formed with an upwardly extending portion having a slot therein, and a clamping member carried by the casing and passing through said slot for securing the hinged bottom member in adjusted position.

In testimony whereof I affix my signature.

GIUSTO BOGGIO.